(12) United States Patent
Fujimura et al.

(10) Patent No.: US 7,175,348 B2
(45) Date of Patent: *Feb. 13, 2007

(54) LINEAR GUIDE APPARATUS AND METHOD FOR ASSEMBLING THE SAME

(75) Inventors: Nobuaki Fujimura, Saitama (JP); Toshio Yoshida, Saitama (JP)

(73) Assignee: NSK, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/218,552

(22) Filed: Sep. 6, 2005

(65) Prior Publication Data

US 2006/0029307 A1   Feb. 9, 2006

Related U.S. Application Data

(63) Continuation of application No. 10/682,516, filed on Oct. 10, 2003, now Pat. No. 6,957,916.

(30) Foreign Application Priority Data

Oct. 11, 2002 (JP) .............................. 2002-298809

(51) Int. Cl.
*F16C 29/06* (2006.01)
(52) U.S. Cl. ...................................... 384/45
(58) Field of Classification Search ............ 384/43–45
See application file for complete search history.

(56) References Cited

U.S. PATENT DOCUMENTS

| 5,755,516 | A | * | 5/1998 | Teramachi et al. ............ 384/45 |
| 5,829,883 | A | | 11/1998 | Kawaguchi et al. |
| 6,170,986 | B1 | | 1/2001 | Hsu et al. |
| 6,200,031 | B1 | | 3/2001 | Faulhaber et al. |
| 6,685,355 | B2 | | 2/2004 | Kuwahara |

FOREIGN PATENT DOCUMENTS

| JP | 61-85716 U | 6/1986 |
| JP | 07-317762 A | 12/1995 |
| JP | 2846050 B2 | 10/1998 |

* cited by examiner

*Primary Examiner*—Thomas R. Hannon
(74) *Attorney, Agent, or Firm*—Sughrue Mion, PLLC

(57) ABSTRACT

A slider is formed by a metallic main body, a synthetic resin-made frame, and a pair of end caps. The frame is detachably fitted to outer sides of the main body. Ball rolling grooves are provided in the main body. Return paths and inside grooves of a direction changing path are provided in the frame. An outside groove of the direction changing path are provided in each end cap. A paste-like filler is applied to a boundary portion between the main body and the frame and a boundary portion between the frame and the end cap, and is allowed to cure.

8 Claims, 6 Drawing Sheets

LINEAR GUIDE APPARATUS AND METHOD FOR ASSEMBLING THE SAME

This is a continuation of application Ser. No. 10/682,516 filed Oct. 10, 2003 now U.S. Pat. No. 6,957,916. The entire disclosure of the prior application, application Ser. No. 10/682,516, is hereby incorporated by reference.

BACKGROUND OF THE INVENTION

1. Field of the Invention

The present invention relates to a linear guide apparatus and a method for assembling the linear guide apparatus.

2. Description of the Related Art

A example of a related-art linear guide apparatus is shown in FIG. 9. As shown in this drawing, the linear guide apparatus includes a guide rail 1, a slider (also called a bearing) 2, and a plurality of balls (rolling elements) 3.

The guide rail 1 has a pair of ball rolling grooves 11 respectively provided in both side surfaces thereof and extending parallel to the longitudinal direction. The slider 2 includes a pair of leg portions 2A respectively disposed on widthwise both sides of the guide rail 1, and a horizontal portion 2B connecting both leg portions 2A. The horizontal portion 2B is disposed at one end side (in this drawing, on the upper surface side of the guide rail 1), as viewed in the thicknesswise direction (i.e., in a direction perpendicular to both the longitudinal direction and the widthwise direction), of the guide rail 1. Both inner side surfaces of the slider 2 are disposed in face-to-face relation to both side surfaces of the guide rail 1.

The slider 2 is divided into a main body 21 and a pair of end caps 22 in the linearly moving direction, and the end caps 22 are respectively disposed on both ends, as viewed in the linearly moving direction, of the main body 21. A pair of ball rolling grooves 21a respectively opposing the ball rolling grooves 11 of the guide rail 1 are formed in each of both inner side surfaces of this main body 21. A ball rolling path 12 of the balls 3 is formed by the ball rolling grooves 11 and 21a.

A linear return path 21b is formed on the outer side of each ball rolling groove 21a of the main body 21 of the slider 2. A pair of semicircular arc shaped direction changing paths 22a are each formed in that portion of the respective end cap 22 (a longitudinally outer portion of each end cap 22) which is disposed on each side surface of the guide rail 1. The ball rolling path 12 and the return path 21b are made to communicate with each other by these direction changing paths 22a. Three paths constitute a circulating path 25 for endlessly circulating the balls 3. This linear guide apparatus has four (two pairs of) circulating paths, and as the balls 3 roll along the circulating paths, the slider 2 slides along the guide rail 1.

In the related-art linear guide apparatus, the return paths 21b are formed in the metallic main body 21 by drilling, but this operation requires time and trouble and involves cost.

As an alternative method, a method is disclosed in JP-UM-A-61-85716 and the like in which a groove with a concave cross section is provided in an outer side surface of each leg portion of the slider. This groove is covered by a closing member, and both longitudinal ends of this closing member are respectively fixed to end caps. In this method, the return path is formed by both the groove and the inner surface of the closing member.

With the method of the above-described publication, however, the number of component parts becomes greater than that of the method in which the metallic main body is subjected to drilling, so that assembly becomes complex. In a case where the fixation of the closing member becomes insufficient, the component parts vibrate and generate noise.

In addition, JP-B-2846050 discloses a technique in which the slider is divided into a metallic block, a substantially square annular body made of a synthetic resin, and a pair of synthetic resin-made plates. As viewed in the widthwise direction, each of both leg portions of this slider is divided into the block, the substantially square annular body, and the plate. Further, as viewed in the thicknesswise direction, each leg portion (a widthwise outer portion of the leg portion) is divided into two parts of the substantially square annular body and the plate. Further, a groove of a shape in which a return path and a pair of direction changing paths formed continuously are divided into two parts as viewed in the thicknesswise direction is formed in each of the substantially square annular body and the plate.

In the slider disclosed in this publication, since the direction changing path is formed by the groove divided into two parts as viewed in the thicknesswise direction, a scooping portion called a tongue for causing the rolling elements to move from the ball rolling groove to the direction changing path (or vice versa) is also made up by two divided bodies as viewed in the thicknesswise direction. Therefore, as compared with the case where the tongue is made up by a nondivided body, the strength of the tongue declines.

As a proposal which makes it possible to overcome these problems, JP-A-7-317762 discloses a technique in which at least the widthwise outer portion of the leg portion (the portion where the return path is formed) is formed integrally with a block as a molded piece made of a synthetic resin, thereby forming the slider in which the return path is formed by a nondivided body.

However, in the case of the slider disclosed in JP-A-7-317762, a molded piece having the widthwise outer portions of the leg portions is fixed to the block by integral molding, so that correction after molding is difficult. In addition, since the structure of a mold for integral molding becomes complex, there is leeway for improvement in terms of productivity.

Namely, in the slider disclosed in JP-A-7-317762, since the slider is continuously covered with the resin, it is utterly impossible to effect correction including the correction of such as the depth or the shape of the ball rolling grooves after molding. Accordingly, in a case where adjustment of a preload and improvement of the actuation characteristic are required, the resin must be destroyed. In addition, since the resin is allowed to flow with a small thickness around the periphery of the slider, particularly since the resin is allowed to flow in an elongated form along the longitudinal direction of the slider, molderability is poor, and the structure of the mold is complex. Further, since the steps of placing the slider in the mold and cooling it after molding are required, processing takes time.

SUMMARY OF THE INVENTION

The present invention has been devised to overcome the above-described problems of the related art, and its object is to provide a linear guide apparatus and a method for assembling the linear guide apparatus having a slider in which two or more members formed by separate members are integrated in the assembly process, and which has high productivity and is satisfactory in terms of the actuation characteristic and the noise characteristic.

To attain the above object, in accordance with the invention there is provided a linear guide apparatus including a guide rail, a slider, and a plurality of rolling elements, wherein a first ball rolling groove for the rolling elements is formed on each widthwise opposite surface of the guide rail; the slider includes a pair of leg portions respectively disposed on widthwise opposite sides of the guide rail, and a horizontal portion disposed on one thicknesswise end side of the guide rail and connecting the leg portions; a second ball rolling groove disposed in face-to-face relation to the first ball rolling groove of the guide rail is provided on an inner side surface of each of the leg portions, a ball rolling path for the rolling elements being formed by the first ball rolling groove and the second ball rolling groove, a return path for the rolling elements being formed in each of the leg portions, a pair of direction changing paths for allowing the return path and the ball rolling path to communicate with each other being formed in each of the leg portions; and one of the guide rail and the slider linearly moves relative to another one thereof as the rolling elements roll in a circulating path formed by the ball rolling path, the return path, and the direction changing paths, the linear guide apparatus being characterized by the following features (1) to (5):

(1) The slider includes a metallic main body, a synthetic resin-made frame which is detachably fitted to outer sides of the main body, and a pair of synthetic resin-made end caps which are fixed to the main body through the frame.

(2) The frame includes a pair of outer legs each constituting a widthwise outer portion of the leg portion, and a pair of frame horizontal portions each constituting an opposite end portion, as viewed in a linearly moving direction, of the horizontal portion. The return path and an inside groove of the direction changing path are provided in each of the outer legs. A protrusion (e.g., a protrusion parallel to the return path) is provided on an inner side of each of the outer legs.

(3) The main body includes a pair of inner legs each constituting a widthwise inner portion of the leg portion and a main body horizontal portion constituting a major portion of the horizontal portion. The ball rolling groove is provided on an inner side of each of the inner legs. A recessed portion (e.g., a recessed portion parallel to the ball rolling groove) corresponding to the protrusion is provided on an outer side of each of the inner legs. The main body and the frame are adapted to be integrated as the protrusion is fitted to the recessed portion.

(4) Each of the end caps includes a pair of end legs each constituting an end portion, as viewed in the linearly moving direction, of the leg portion, and an end cap horizontal portion constituting an extreme end portion, as viewed in the linearly moving direction, of the horizontal portion. An outside groove of the direction changing path is provided on a frame side of each of the end legs.

(5) A filler is disposed in a boundary portion between the main body and the frame and a boundary portion between the frame and each of the end caps.

It should be noted that, in the linear guide apparatus in accordance with the invention, the horizontal portion of the slider is formed by the frame horizontal portion, the main body horizontal portion, and the end cap horizontal portions mentioned above. In a case where reference is simply made to the "horizontal portion," it refers to the horizontal portion of the slider as a whole including these portions.

In the linear guide apparatus in accordance with the invention, a longest outside dimension in the slider-widthwise direction between end portions, each lower than the recessed portion, of both inner legs of the main body is preferably formed to be greater than a shortest dimension in the slider-widthwise direction between the protrusions of the frame. The attachment and detachment are preferably effected by inserting and removing the leg portion sides of the main body from the frame horizontal portion side by elastically deforming the frame.

In the linear guide apparatus in accordance with the invention, as the method of fixing the end caps and the frame with respect to the main body, it is possible to a fixing method using screws in which internal threads are respectively formed in opposite end faces, as viewed in the linearly moving direction, of the main body horizontal portion, while through holes corresponding to the internal threads are formed in the frame horizontal portion and the end cap horizontal portions, and male screws are inserted in the through holes and are threadedly engaged with the internal threads. Alternatively, it is possible to cite a method in which projections having a welding allowance are provided on one of the end cap-side face of each frame horizontal portion and the frame-side face of each end cap horizontal portion, and the frame to which the main body is fitted and each end cap are welded together.

DETAILED DESCRIPTION OF THE INVENTION

Hereafter, a description will be given of the embodiments of the invention.

Figure 1:
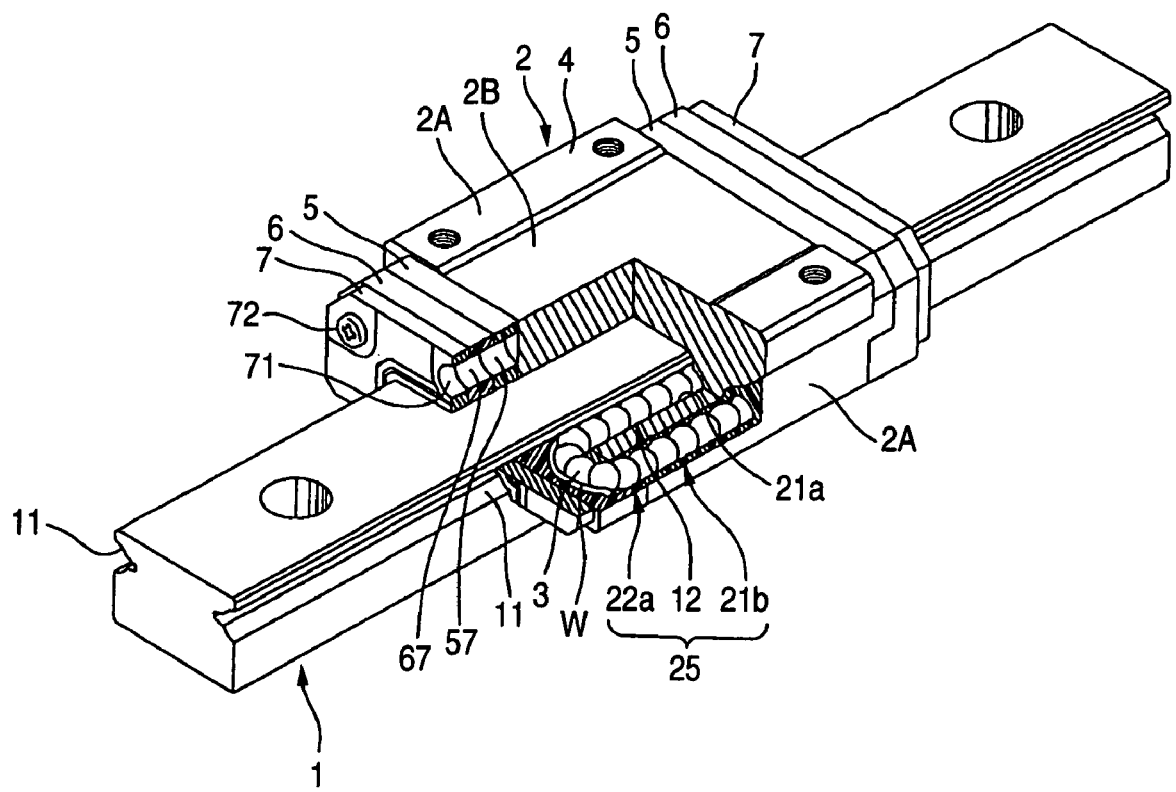
FIG. 1 is a perspective view illustrating a linear guide apparatus in accordance with an embodiment of the invention.

FIG. 1 is a perspective view illustrating a linear guide apparatus in accordance with a first embodiment of the invention. This linear guide apparatus includes a guide rail 1, a slider 2, and a plurality of balls (rolling elements) 3.

The guide rail 1 has a pair of ball rolling grooves 11 respectively provided in both side surfaces thereof and extending parallel to the longitudinal direction. The slider 2 includes a pair of leg portions 2A respectively disposed on widthwise both sides of the guide rail 1, and a horizontal portion 2B connecting both leg portions 2A. The horizontal portion 2B is disposed at one end side (in this drawing, on the upper surface side of the guide rail 1), as viewed in the thicknesswise direction (i.e., in a direction perpendicular to both the longitudinal direction and the widthwise direction), of the guide rail 1. Both inner side surfaces of the slider 2 are disposed in face-to-face relation to both side surfaces of the guide rail 1.

A pair of ball rolling grooves 21a respectively opposing the ball rolling grooves 11 of the guide rail 1 are formed in each of inner side surfaces of both leg portions 2A of the slider 2. A ball rolling path 12 of the balls 3 is formed by the ball rolling grooves 11 and 21a.

A linear return path 21b for the balls is formed in an outer portion of each leg portion 2A, and a pair of direction changing paths 22a for allowing this return path 21b and the ball rolling path 12 to communicate with each other are formed therein. The return path 21b, the ball rolling path 12, and the direction changing paths 22a constitute a circulating path 25 for endlessly circulating the balls 3. This linear guide apparatus has two (one pair of) circulating paths, and as the balls 3 roll along the circulating paths, the slider 2 slides along the guide rail 1.

The slider 2 of this embodiment includes a metallic main body 4, a synthetic resin-made frame 5, and a pair of synthetic resin-made end caps 6. In addition, a side seal 7 is attached to an outer side of each end cap 6.

Figure 2:
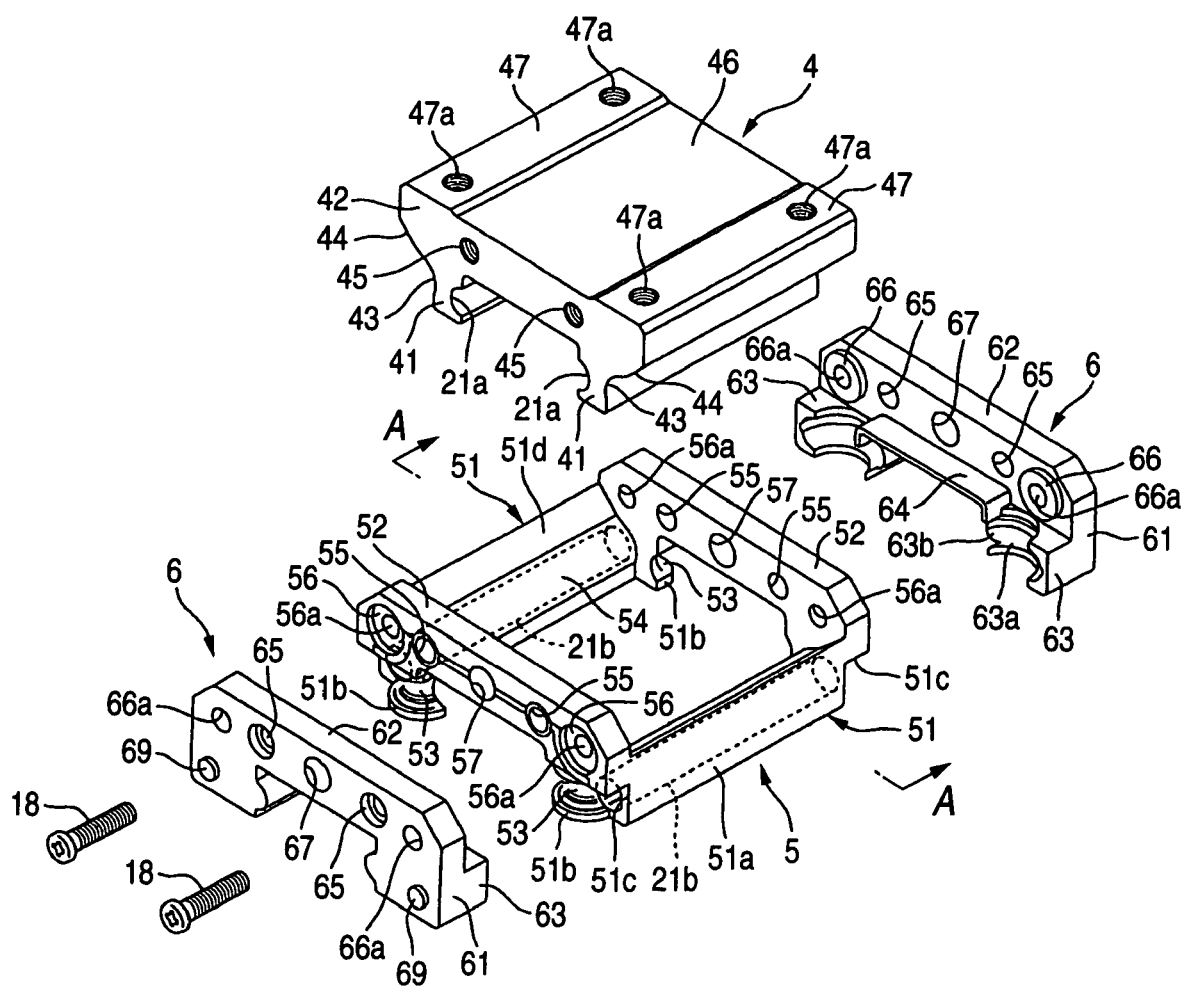
FIG. 2 is a diagram illustrating a slider for making up the linear guide apparatus shown in FIG. 1, and is a perspective view illustrating an exploded state of the slider.
Figure 3:
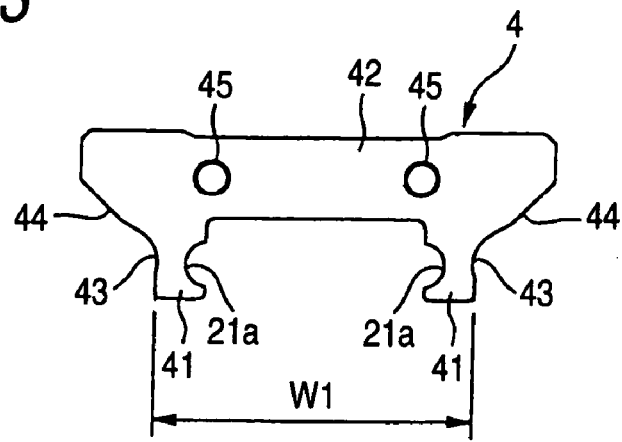
FIG. 3 is a front elevational view illustrating a main body for making up the slider shown in FIG. 2.
Figure 4:
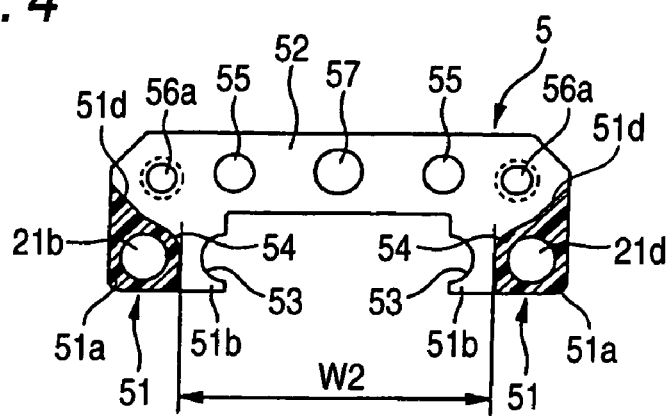
FIG. 4 is a diagram illustrating a frame for making up the slider shown in FIG. 2, and corresponds to a cross-sectional view taken along line A—A in FIG. 2.

An exploded state of the slider 2 is shown by a perspective view in FIG. 2. Further, a front elevational view of the main body 4 is shown in FIG. 3, and a cross-sectional view, taken along line A—A of FIG. 2, of the frame 5 is shown in FIG. 4.

As shown in these drawings, the main body 4 includes a pair of inner legs 41 respectively constituting widthwise inner portions of both leg portions 2A, and a main body horizontal portion 42 constituting a major portion of the horizontal portion 2B of the slider as a whole. In addition, a ball rolling groove 21a is formed on the inner side of each inner leg 41, while a recessed portion 43 parallel to the ball rolling groove 21a is provided on the outer side of the inner leg 41. A portion between this recessed portion 43 and a widthwise end face of the main body horizontal portion 42 is formed into a tapered surface 44 where the recessed portion 43-side dimension is smaller.

In addition, two internal threads 45 are formed in each of both end faces, as viewed in the linearly moving direction, of the main body horizontal portion 42. The two internal threads 45 are disposed at a predetermined interval therebetween in the widthwise direction. A recessed portion 46 is formed in a slider-widthwise-central portion of the upper surface of the main body horizontal portion 42. Two internal threaded holes 47a for mounting another member such as a table are formed in an outside portion 47 on each side of this recessed portion 46 in such a manner as to be spaced apart a predetermined interval in the linearly moving direction.

It should be noted that this main body 4 is fabricated by subjecting a material made of a metal such as SUS 440 C to such as drawing and cutting.

The frame 5 includes a pair of outer legs 51 respectively constituting widthwise outer portions of both leg portions 2A, and a pair of frame horizontal portions 52 constituting end portions, as viewed in the linearly moving direction, of the horizontal portion 2B of the slider as a whole.

The outer leg 51 includes a first portion 51a and a pair of second portions 51b, and the first portion 51a is disposed so as to connect the two frame horizontal portions 52, the return path 21b being formed in its interior. The second portion 51b is a semicircular arc shaped projection extending from the first portion 51a toward the outer surface of each frame horizontal portion 52. An inside groove 53 of the direction changing path 22a continuing to the return path 21b is formed in this projection. A stepped portion 51c exists between the first portion 51a and the second portion 51b. Further, the upper surface (the frame horizontal portion 52-side surface) of the first portion 51a is formed into a tapered surface 51d fitting to the tapered surface 44 of the main body 4.

A protrusion 54 parallel to the return path 21b is formed on the inner side of the first portion 51a of each outer leg 51. A pair of through holes 55 corresponding to the internal threads 45 of the main body 4 are formed in the frame horizontal portion 52. A pair of recessed portions 56 for positioning with respect to the end cap 6, and a pair of through holes 56a each penetrating the center of this recessed portion 56, are formed at widthwise opposite end portions of the frame horizontal portion 52. A through hole 57 is formed in a widthwise central portion of the frame horizontal portion 52. This through hole 57 is a hole communicating with a through hole (grease-nipple attaching hole) 67 provided in the end cap 6.

It should be noted that this frame 5 is fabricated by injection molding a synthetic resin such as polyoxymethylene (POM).

The end caps 6 are members which are disposed at both ends, as viewed in the linearly moving direction, of the frame 5. Each end cap 6 includes a pair of end legs 61 each constituting an end portion, as viewed in the linearly moving direction, of each leg portion 2A, and an end cap horizontal portion 62 constituting an extreme end portion, as viewed in the linearly moving direction, of the horizontal portion 2B of the slider as a whole. A projection 63 having a semicircular arc shaped recess is formed on the frame side of the end leg 61, and an outside groove 63a of the direction changing path 22a is formed in this projection 63. A widthwise inner end portion of this outside groove 63a is formed as a tongue 63b for scooping the balls 3 from the ball rolling groove 12. In addition, a plate-shaped member 64 extending from a lower surface of the end cap horizontal portion 62 is formed between the two projections 63 and with the same projecting length as that of the projections 63.

In addition, a pair of through holes 65 corresponding to the internal threads 45 of the main body 4 are formed in the end cap horizontal portion 62. A pair of projections 66 for positioning with respect to the frame 5, and a pair of through holes 66a each penetrating the center of this projection 66, are formed at inner surfaces of widthwise opposite end portions of the end cap horizontal portion 62. As the projections 66 are fitted in the recessed portions 56 of the frame 5, the through holes 56a of the frame 5 and the through holes 66a of the end cap 6 communicate with each other.

The through hole 67 is formed in the widthwise central portion of the end cap horizontal portion 62. This through hole 67 is a grease-nipple attaching hole, and the through hole 57 of the frame 5 is formed in such a manner as to communicate therewith. A through hole 71 also communicating therewith is formed in the side seal 7. Further, a projecting portion 69 for positioning with respect to the side seal 7 is formed on an outer surface of the end leg 61.

It should be noted that this end cap 6 is fabricated by injection molding a synthetic resin such as POM.

Here, a longest outside dimension W1 (shown in FIG. 3) in the slider-widthwise direction between lower end portions (end portions which are farther from the main body horizontal portion 42 than the recessed portion 43 in the thicknesswise direction of the main body 4. In other word, end portions lower than the recessed portions 43) of the inner legs 41 of the main body 4 is formed to be greater than a shortest dimension W2 (shown in FIG. 4) in the slider-widthwise direction between the protrusions 54 of the frame 5.

The assembly of the slider 2 is effected by a manual operation or press working. In the case of the manual operation, the inner legs 41 of the main body 4 (leg portion sides of the main body) are first inserted into the frame 5 from the frame horizontal portion 52 side. In this state, the operator applies, for example, the thumb to either one of the outside portion 47 on the upper surface of the main body horizontal portion 42 and the lower surface of the first portion 51a of the outer leg 51 of the frame 5, and applies the forefinger and the middle finger to the other one thereof. By thus using both hands for the left and right sides simultaneously, the operator applies forces acting in directions in which the thumb, on the one hand, and the forefinger and the middle finger, on the other hand, approach each other.

Figure 5:
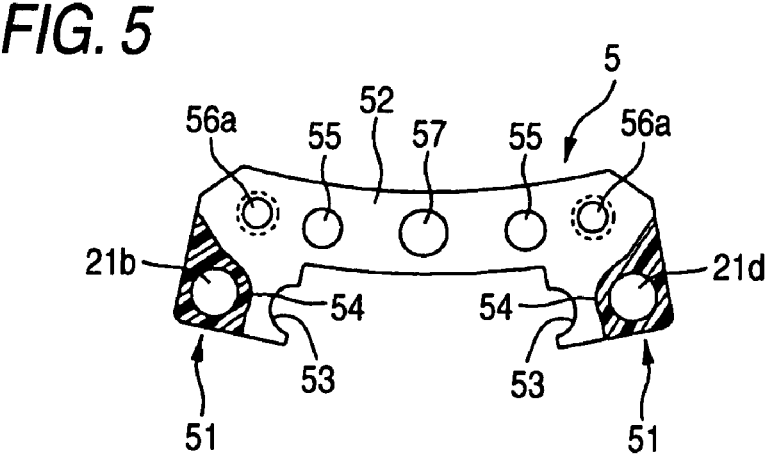
FIG. 5 is a cross-sectional view illustrating an elastically deformed state of the frame shown in FIG. 4.

Consequently, the frame 5 undergoes elastic deformation, as shown in FIG. 5, and the protrusions 54 of the frame 5 are fitted to the recessed portions 43 of the main body 4. In addition, the inner legs 41 of the main body 4 and the first members 51a of the outer legs 51 of the frame 5 are fitted to each other. Further, the tapered surfaces 44 of the main body 4 and the tapered surfaces 51d of the frame 5 are fitted to each other, and the outer surface of the main body horizontal portion 42 of the main body 4 and the inner surface of the frame horizontal portion 52 of the frame 5 are fitted to each other. Thus the main body 4 and the frame 5 are easily integrated, and positioning in the widthwise direction, the linearly moving direction, and the vertical direction (thicknesswise direction) is effected accurately.

In addition, when the main body 4 is removed from the frame 5, the operator holds one end, as viewed in the linearly moving direction, of this integrated subassembly by one hand, and holds the other end by the other hand. In each hand, the operator applies, for example, the thumb to the lower surface of the main body horizontal portion 42 of the main body 4, and applies the forefinger and the middle finger to the upper surface of the frame horizontal portion 52 of the frame 5. In this state, the operator simultaneously applies both a force for upwardly pressing the main body horizontal portion 42 by the thumb and a force for downwardly pressing the upper surface of the frame horizontal portion 52 by the forefinger and the middle finger. Consequently, the frame 5 undergoes elastic deformation, as shown in FIG. 5, and the fitting of the respective portions of the main body 4 and the frame 5 is canceled.

After the main body 4 and the frame 5 are integrated in the above-described manner, the end caps 6 are disposed at both ends, as viewed in the linearly moving direction, of the frame 4, and the projections 66 of the end caps 6 are fitted to the recessed portions 56 of the frame 5, thereby fitting the projections 63 of the end caps 6 to the stepped portions 51c of the frame 5. In addition, the plate-shaped members 64 of the end caps 6 are fitted to the respective lower surfaces of the frame horizontal portions 52 of the frame 5, and the through holes 55 in the frame horizontal portions 52 of the frame 5 communicate with the through holes 65 in the end caps 6. Further, through holes 56a in the frame 5 and the through holes 66a in the end caps 6 communicate with each other.

Figure 6:
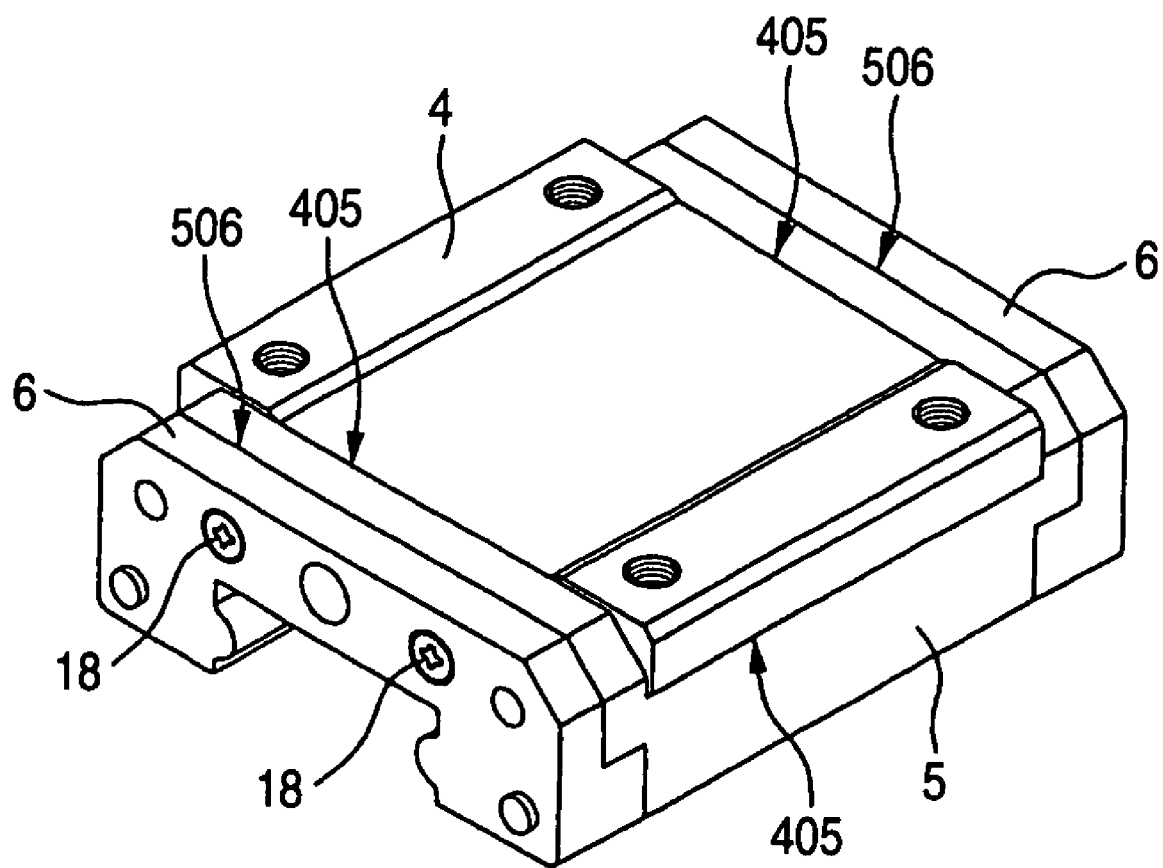
FIG. 6 is a perspective view illustrating an assembled state of the slider shown in FIG. 2.

Then, screws 18 are inserted in the through holes 55 and 65 from the outer sides of the end caps 6, and tips of the screws 18 are threadedly engaged in the internal threads 45. Consequently, the main body 4, the frame 5, and the end caps 6 are integrated, as shown in FIG. 6. Next, a paste-like filler is applied to boundary portions 405 between the main body 4 and the frame 5 and boundary portions 506 between the frame 5 and the respective end cap 6, and is allowed to cure. Consequently, it is possible to obtain the slider 2 in which the filler is disposed at the boundary portions 405 between the main body 4 and the frame 5 and the boundary portions 506 between the frame 5 and the end cap 6.

As the paste-like filler, it is possible to cite, for example, a silicone rubber base filler (e.g., silicone putty made by Shin-Etsu Chemical Co., Ltd.), a room temperature valcanization (RTV) rubber base filler (e.g., "SuperThreeBond" made by Three Bond Co., Ltd.), and so on.

The linear guide apparatus shown in FIG. 1 is assembled by using the slider 2 thus assembled, the balls 3, the guide rail 1, the side seals 7, and a holding wire W. At that time, the balls 3 are first placed in the return paths 21b, the direction changing paths 22a, and the ball rolling grooves 21a of the slider 2, and after the balls 3 placed in the ball rolling grooves 21a are held by the holding wire W, this slider 2 is assembled to the guide rail 1.

Next, the side seals 7 are positioned on the slider 2 by making use of the projecting portions 69 of the end caps 6, and the side seals 7 are fixed to the slider 2 by means of tapping screws 72 by making use of the through holes 56a and 66a. Grease nipples are respectively inserted in the through holes 67 (grease-nipple attaching holes) of the end caps 6 via through holes 71 of the side seals 7.

According to the linear guide apparatus of this embodiment, as the filler is disposed at the boundary portions 405 and 506 of the respective members (the main body 4, the frame 5, and the end caps 6) making up the slider 2, it is possible to seal the gaps occurring at the respective boundary portions due to such as machining errors of the main body 4 and variations in dimensions at the time of the molding of the frame 5 and the end caps 6. Consequently, since the entry of foreign objects and the occurrence of vibrations due to the gaps are prevented, the actuation characteristic and the noise characteristic improve in comparison with the case where such a filler is not disposed.

In addition, the slider 2 is divided into the main body 4 having the ball rolling grooves 21a, the frame 5 having the return paths 21b and the inside grooves 53 of the direction changing paths 22a, and the end caps 6 having the outside grooves 63a of the direction changing paths 22a. Therefore, correction of the shapes of the ball rolling grooves can be effected easily after molding in comparison with the slider disclosed in the above-described JP-A-7-317762 in which the molded piece (the portion corresponding to the frame 5 of this embodiment) including the return path portions is molded integrally with the block.

In addition, since the frame 5 is molded as a single unit, molderability is more satisfactory and the structure of the mold can be made simpler than in the case of integral molding. In addition, since the production of the frames 5 proceeds independently of the production of the main bodies 4, it is possible to adopt a production system which pursues the molding efficiency. Furthermore, the main body 4 and the frame 5 can be easily attached to or detached from each other even by the manual operation, as described above, and the frame 5 together with the end caps 6 can be easily and reliably fixed to the main body 4 by the screws. Thus, the slider 2 of this embodiment is advantageous in terms of productivity in comparison with the slider disclosed in the above-described JP-A-7-317762.

Figure 7:
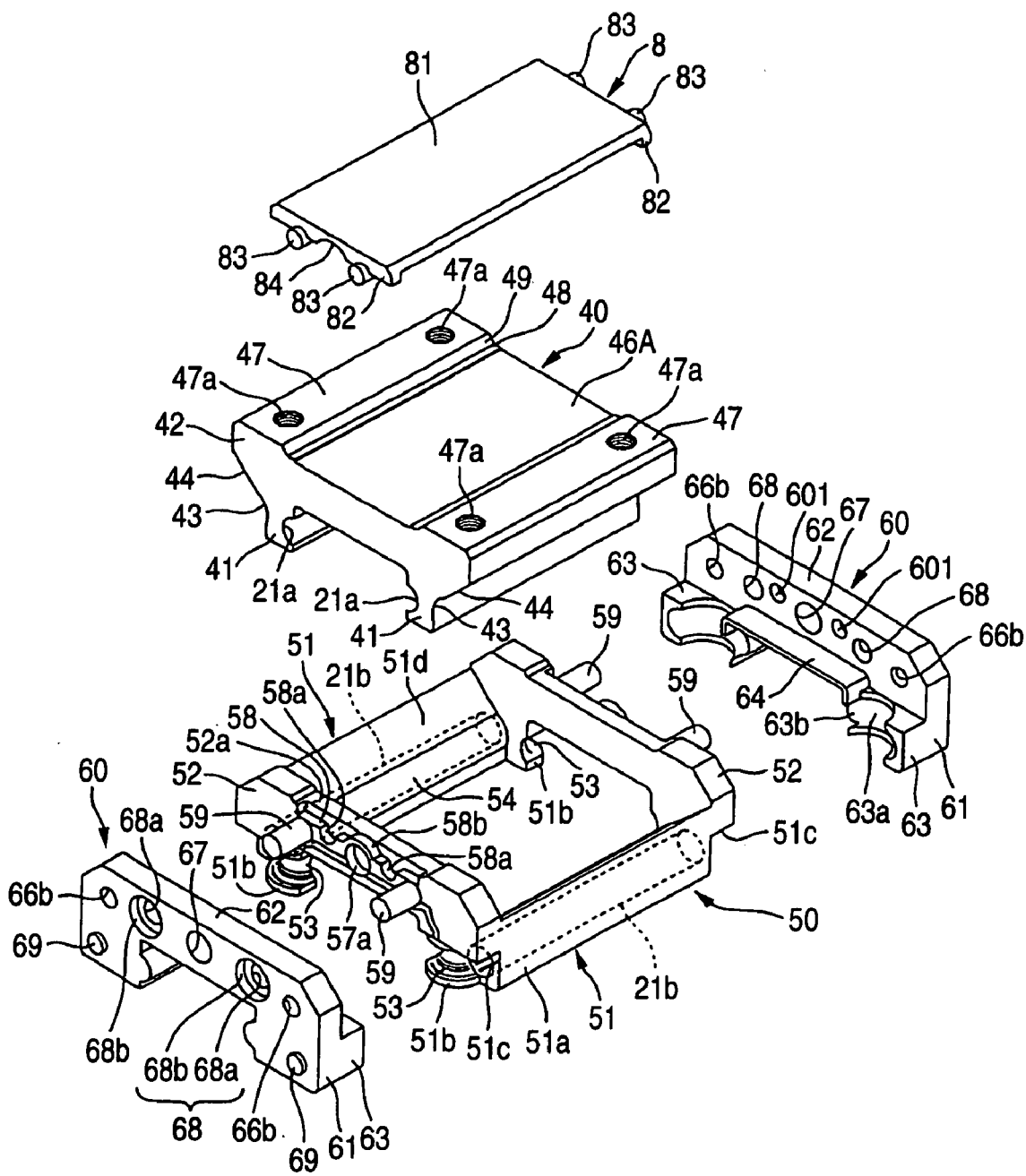
FIG. 7 is a diagram of the slider for making up the linear guide apparatus shown in FIG. 1 in accordance with another embodiment different from the one shown in FIG. 2, and is a perspective view illustrating an exploded state of this slider.

It should be noted that although, in the above-described embodiment, the slider is assemble by fixing the frame 5 and the end caps 6 to the main body 4 by the screws, the slider (the slider including the main body, the frame, and the end caps) for making up the linear guide apparatus in accordance with the invention can be assembled without using the screws. One such example is shown below. In this example, the slider 2 for making up the linear guide apparatus shown in FIG. 1 is structured, as shown in FIG. 7, for example. This embodiment will be described hereafter.

This slider includes a metallic main body 40, a synthetic resin-made frame 50, a pair of synthetic resin-made end caps 60, and a synthetic resin-made top cover 8. It should be noted that the top cover 8 is used for positively preventing the main body 40 from coming off the frame 50 in the vertical direction. FIG. 7 is a perspective view illustrating an exploded state of this slider.

As shown in FIG. 7, the main body 40 includes the pair of inner legs 41 respectively constituting widthwise inner portions of both leg portions 2A, and the main body horizontal portion 42 constituting a major portion of the horizontal portion 2B of the slider as a whole. In addition, the ball rolling groove 21a is formed on the inner side of each inner leg 41, while the recessed portion 43 parallel to the ball rolling groove 21a is provided on the outer side of the inner leg 41. At widthwise opposite end faces of the main body 40, the portion between the recessed portion 43 and the main body horizontal portion 42 is formed into the tapered surface 44 where the recessed portion 43-side dimension is smaller.

In addition, a recessed portion 46A is formed in a slider-widthwise-central portion of the upper surface of the horizontal portion 2B. The two internal threaded holes 47a for mounting another member such as a table are formed in the outside portion 47 on each side of this recessed portion 46A in such a manner as to be spaced apart a predetermined interval in the linearly moving direction. An edge portion 48 and an inclined portion 49 are formed between this recessed portion 46A and each outside portion 47 in that order from the recessed portion 46A toward the outside portion. The surface of the edge portion 48 is formed as a slightly higher surface than the recessed portion 46A, and the distance between both edge portions 48 is set to a dimension slightly greater than the width of the top cover 8. Namely, the upper surface of the horizontal portion 2B of the main body 40 is formed such that the top cover 8 is loosely fitted in the recessed portion 46A.

It should be noted that this main body 40 is fabricated by subjecting a material made of a metal such as SUS 440 C to such as drawing and cutting.

The top cover 8 includes an elongated plate-shaped cover portion 81, and a pair of leg portions (engaging portions) 82 and two pairs of projections (engaging portions) 83 which are respectively provided at longitudinal both ends (in the linearly moving direction) of the cover portion 81. The leg portions 82 are formed in such a manner as to extend perpendicularly from the plate surface of the cover portion 81, and an arcuate recessed portion 84 is formed at the position of the leg portion 82 corresponding to a plate-widthwise center of the cover portion 81. Each projection 83 is cylindrical, and its proximal end is disposed on the lower surface of the leg portion 82, while its distal end projects from each longitudinal opposite end of the cover portion 81 toward the outside. The length (dimension in the linearly moving direction) of the cover portion 81 is the same as the dimension in the linearly moving direction of the frame 50.

The frame 50 includes the pair of outer legs 51 respectively constituting widthwise outer portions of both leg portions 2A, and the pair of frame horizontal portions 52 constituting end portions, as viewed in the linearly moving direction, of the horizontal portion 2B of the slider as a whole.

The outer leg 51 includes the first portion 51a and the pair of second portions 51b, and the first portion 51a is disposed so as to connect the two frame horizontal portions 52, the return path 21b being formed in its interior. The second portion 51b is a semicircular arc shaped projection extending from the first portion 51a toward the outer surface of each frame horizontal portion 52. The inside groove 53 of the direction changing path 22a continuing to the return path 21b is formed in this projection.

The stepped portion 51c exists between the first portion 51a and the second portion 51b. Further, the upper surface (the frame horizontal portion 52-side surface) of the first portion 51a is formed into the tapered surface 51d fitting to the tapered surface 44 of the main body 40. The protrusion 54 parallel to the return path 21b is formed on the inner side of the first portion 51a of each outer leg 51.

A recessed portion 52a continuing to the recessed portion 46A of the main body 40 is formed in the frame horizontal portion 52. Further, a recessed portion (fitting portion) 58, into which the engaging portions (the leg portion 82, the projections 83, and the recessed portions 84) provided in each opposite end, as viewed in the linearly moving direction, of the top cover 8 are fitted, is provided in its end portion as viewed in the linearly moving direction. Formed in this recess portion 58 are two circular arc-shaped recessed portions 58a into which the two projections 83 of the top cover 8 are fitted, and a circular arc-shaped projecting portion 58b which is disposed between the two circular arc-shaped recessed portions 58a (a widthwise central portion) and into which the recessed portion 84 of the top cover 8 is fitted.

In addition, a hole 57a which is a circular hole concentric with the circle formed by the circular arc-shaped projecting portion 58b is formed in the frame horizontal portion 52. This hole 57a is a hole communicating with the through hole (grease-nipple attaching hole) 67 provided in the end cap 6. Further, a pair of projections 59 extending in the linearly moving direction are formed on the outer side of this horizontal portion 52 at positions located widthwise outwardly of the two circular arc-shaped recessed portions 58a.

It should be noted that this frame 50 is fabricated by injection molding a synthetic resin such as POM.

The end caps 60 are members which are disposed at both ends, as viewed in the linearly moving direction, of the frame 50. Each end cap 60 includes the pair of end legs 61 each constituting an end portion, as viewed in the linearly moving direction, of each leg portion 2A, and the end cap horizontal portion 62 constituting an extreme end portion, as viewed in the linearly moving direction, of the horizontal portion 2B of the slider as a whole. The projection 63 having a semicircular arc shaped recess is formed on the frame side of the end leg 61, and the outside groove 63a of the direction changing path 22a is formed in this projection 63. A widthwise inner end portion of this outside groove 63a is formed as the tongue 63b for scooping the balls 3 from the ball rolling groove 12. In addition, the plate-shaped member 64 extending from a lower surface of the end cap horizontal portion 62 is formed between the two projections 63 and with the same projecting length as that of the projections 63.

The through hole 67 is formed in the widthwise central portion of the end cap horizontal portion 62. This through hole 67 is a grease-nipple attaching hole, and the through hole 57 of the frame 50 is formed in such a manner as to communicate therewith. The through hole 71 also communicating therewith is formed in the side seal 7. A pair of through holes 66b for passage of the tapping screws 72 (see FIG. 1) for fixing the side seal 7 are formed in widthwise opposite end portions of the end cap horizontal portion 62.

A pair of through holes 68 for passage of the projections 59 of the frame 50 are formed in the end cap horizontal portion 62 at positions between the two through holes 67 and 66b. This through hole 68 includes a small-diameter portion 68a whose diameter is slightly greater than the diameter of the cylinder of the projection 59, and a large-diameter portion 68b whose diameter is greater than the diameter of this small-diameter portion 68a. As the projection 59 enters the small-diameter portion 68a of this through hole 68, the frame 50 is positioned with respect to the end cap 60. It should be noted that the length of the projection 59 is set to such a length that the distal end of the projection 59 in this state projects out slightly from the end cap 60 to the outside.

In addition, a pair of cylindrical recessed portions (fitting portions) 601, into which distal ends of the projections 83 of the top cover 8 are fitted, are formed in an inner surface, as viewed in the linearly moving direction, of the end cap horizontal portion 62 at positions between the through hole 67 and the respective through hole 68a. Further, the projecting portion 69 for positioning with respect to the side seal 7 is formed on the outer surface of the end leg 61 of the end cap 60.

It should be noted that this end cap 60 is fabricated by injection molding a synthetic resin such as POM.

In the slider of this embodiment as well, in the same way as the slider shown in FIG. 2, the longest outside dimension W1 (see FIG. 3) in the slider-widthwise direction between lower end portions (end portions lower than the recessed portions 43) of the inner legs 41 of the main body 40 is formed to be greater than the shortest dimension W2 (see FIG. 4) in the slider-widthwise direction between the protrusions 54 of the frame 50.

The assembly of this slider 2 is effected by a manual operation or press working. In the case of the manual operation, the main body 40 and the frame 50 are first integrated by the manual operation in the same method as that of the above-described integration of the main body 4 and the frame 5. Consequently, the recessed portions 52a of the frame 50 are made to continue to opposite ends, as viewed in the linearly moving direction, of the recessed portion 46A of the main body 40. It should be noted that the detachment of the main body 40 from the frame 50 can also be effected by the manual operation in a method similar to the above-described method of detaching the main body 4 from the frame 5.

Next, the cover portion 81 of the top cover 8 is placed in the recessed portions 46A and 52a. The leg portions 82, the projections 83, and the recessed portions 84 of the top cover 8 are then fitted to the respective positions of the recessed portions 58 of the frame 50. In this state, distal ends of the projections 83 project from opposite ends, as viewed in the linearly moving direction, of the frame 50.

Next, the end caps 60 are disposed at opposite ends, as viewed in the linearly moving direction, of the frame 50, and the projections 59 of the frame 50 are inserted in the through holes 68 of the end caps 60. Consequently, the distal ends of the projections 83 of the top cover 8 are accommodated in the recessed portions 601 of the end cap 60, and the projections 63 of the end caps 60 are fitted to the stepped portions 51c of the frame 50. In addition, the plate-shaped members 64 of the end caps 60 are fitted to the respective lower surfaces of the frame horizontal portions 52 of the frame 50, so that the top cover 8 is retained by the frame 50 and the end caps 60 by fitting. Further, the holes 57a in the frame horizontal portions 52 of the frame 50 communicate with the through holes 67 in the end caps 60. In this state, the distal ends of the projections 59 of the frame 50 project slightly from opposite ends, as viewed in the linearly moving direction, of the end caps 60.

Next, as the distal ends of the projections 59 of the frame 50 are pressurized while being melted on heating by ultrasonic waves by using an ultrasonic plastic welding machine, the synthetic resin forming the distal end portion of each projection 59 is allowed to plastically flow to the gap between the projection 59 and the large-diameter portion 68b of the through hole 68.

Figure 8:
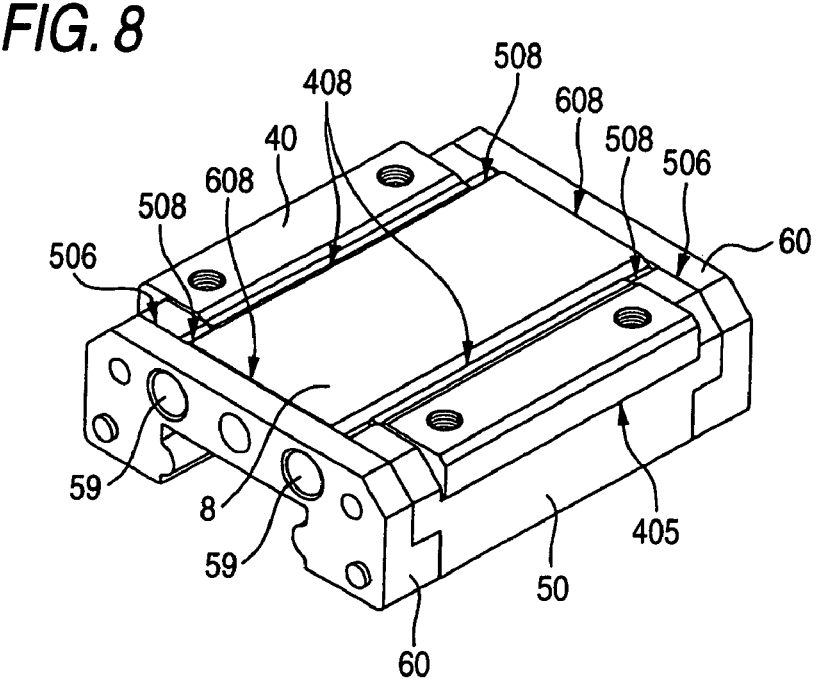
FIG. 8 is a perspective view illustrating an assembled state of the slider shown in FIG. 7.
Figure 9:
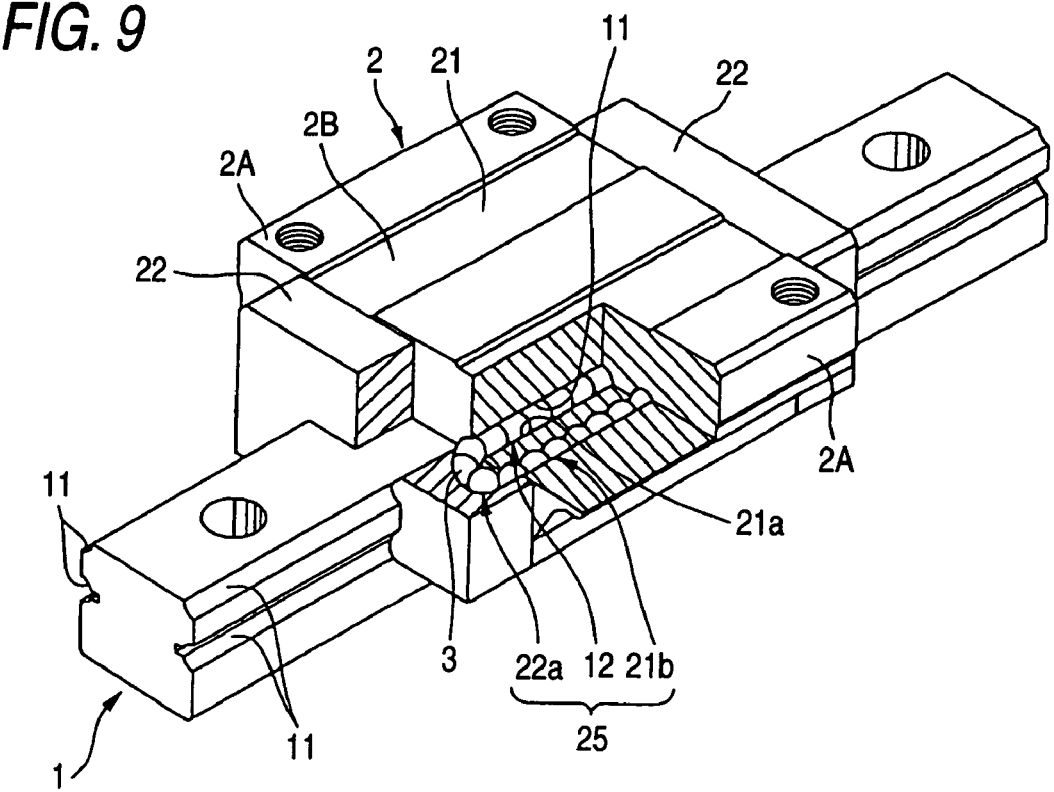
FIG. 9 is a perspective view illustrating an example of the linear guide apparatus in the related art.

Consequently, the end caps 60 are fixed to the frame 50, and the opposite ends, as viewed in the linearly moving direction, of the top cover 8 are fixed to the end caps 60 and the frame 50. As a result, the end caps 60, the frame 50, the main body 40, and the top cover 8 are integrated, as shown in FIG. 8. The main body 40 is vertically fixed to the frame 50 by the fixation of this top cover 8. In addition, this state is such that the projections 59 do not project from the opposite ends, as viewed in the linearly moving direction, of the end caps 60.

Next, a paste-like filler is applied to the boundary portions 405 between the main body 40 and the frame 50, the boundary portions 506 between the frame 50 and the respective end cap 60, boundary portions 508 between the top cover 8 and the frame 50, and boundary portions 408 between the top cover 8 and the main body 40, and is allowed to cure. Consequently, it is possible to obtain the slider 2 in which the filler is disposed at the boundary portions 405 between the main body 40 and the frame 50, the boundary portions 506 between the frame 50 and the end cap 60, the boundary portions 508 between the top cover 8 and the frame 50, and the boundary portions 408 between the top cover 8 and the main body 40.

As the paste-like filler, it is possible to cite, for example, a silicone rubber base filler (e.g., silicone putty made by Shin-Etsu Chemical Co., Ltd.), a room temperature valcanization (RTV) rubber base filler (e.g., "SuperThreeBond" made by Three Bond Co., Ltd.), and so on.

The linear guide apparatus shown in FIG. 1 is assembled by using the slider 2 thus assembled, the balls 3, the guide rail 1, the side seals 7, and the holding wire W. At that time, the balls 3 are first placed in the return paths 21b, the direction changing paths 22a, and the ball rolling grooves 21a of the slider 2, and after the balls 3 placed in the ball rolling grooves 21a are held by the holding wire W, this slider 2 is assembled to the guide rail 1.

Next, the side seals 7 are positioned on the slider 2 by making use of the projecting portions 69 of the end caps 60, and the side seals 7 are fixed to the slider 2 by means of the tapping screws 72 by making use of the through holes 66a of the end caps 60. Grease nipples are respectively inserted in the through holes (grease-nipple attaching holes) of the end caps 60 via through holes 71 of the side seals 7.

According to the linear guide apparatus of this embodiment, as the filler is disposed at the boundary portions 405, 408, 506, 508, and 608 of the respective members (the main body 40, the frame 50, the end caps 60, and the top cover 8) making up the slider 2, it is possible to seal the gaps occurring at the respective boundary portions due to such as machining errors of the main body 40 and variations in dimensions at the time of the molding of the frame 50, the end caps 60, and the top cover 8. Consequently, since the entry of foreign objects and the occurrence of vibrations due to the gaps are prevented, the actuation characteristic and the noise characteristic improve in comparison with the case where such a filler is not disposed.

In addition, the slider 2 is divided into the main body 40 having the ball rolling grooves 21a, the frame 50 having the return paths 21b and the inside grooves 53 of the direction changing paths 22a, and the end caps 60 having the outside grooves 63a of the direction changing paths 22a. Therefore, correction of the shapes of the ball rolling grooves can be effected easily after molding in comparison with the slider disclosed in the above-described JP-A-7-317762 in which the molded piece (the portion corresponding to the frame 50 of this embodiment) including the return path portions is molded integrally with the block.

In addition, since the frame 50 is molded as a single unit, molderability is more satisfactory and the structure of the mold can be made simpler than in the case of integral molding. In addition, since the production of the frames 50 proceeds independently of the production of the main bodies 40, it is possible to adopt a production system which pursues the molding efficiency. Furthermore, the main body 40 and the frame 50 can be easily attached to or detached from each other even by the manual operation, as described above.

In addition, according to the linear guide apparatus of this embodiment, the assembly of the slider 2 is effected by "calking" based on ultrasonic heating (a joining method in which one of two members to be joined is set as a projection, while the other member is provided with a shape into which the projection is accommodated, and this projection is caused to plastically flow). Therefore, it is unnecessary to form internal threads in the metal. Namely, the slider 2 of this embodiment is advantageous in terms of productivity in comparison with the slider disclosed in the above-described JP-A-7-317762 and the case in which fixation is effected by the screws in the structure shown in FIG. 2.

It should be noted that although, in the above-described embodiments, the paste-like filler is allowed to cure after being applied to the respective boundary portions of the slider component members, so as to obtain the slider in which the filler is disposed at the boundary portions. However, in the linear guide apparatus in accordance with the invention, the filler disposed in the respective boundary portions may be not a paste-like one.

In addition, the method for assembling the slider (the slider including the main body, the frame, and the end caps) for making up the linear guide apparatus in accordance with the invention without using screws is not limited to the "calking" based on ultrasonic heating, and may be a welding method which does not accompany "calking."

In addition, although the tapered surfaces 44 each extending between the main body horizontal portion 42 and the recessed portion 43 of the main body 4, 40, and the tapered surface 51d fitting to this tapered surface 44 is provided on the frame 5, 50, this tapered surface 44 is not an essential requirement in the present invention. The boundary (an upper side of the recessed portion 43) between the main body horizontal portion 42 and the inner leg 41 may be formed orthogonally.

In addition, in this embodiment, a description has been given of the linear guide apparatus having two (one pair of) circulating paths. However, the linear guide apparatus in accordance with the invention is not characterized in the number of the circulating paths, and the linear guide apparatus having four (two pairs of) or more circulating paths is naturally included among the linear guide apparatuses in accordance with the invention.

As described above, in accordance with the invention, it is possible to obtain a linear guide apparatus having a slider in which two or more members formed by separate members are integrated in the assembly process, and which has high productivity and is satisfactory in terms of the actuation characteristic and the noise characteristic.

What is claimed is:

1. A linear guide apparatus comprising:
a plurality of rolling elements;
a guide rail having a first ball rolling groove for the rolling elements formed on each widthwise opposite surface; and a slider including a pair of leg portions respectively disposed on widthwise opposite sides of the guide rail, and a horizontal portion disposed on one thicknesswise end side of the guide rail and connecting the leg portions, each of the leg portions having a second ball rolling groove provided on an inner side surface and disposed in face-to-face relation to the first ball rolling groove of the guide rail where a ball rolling path for the rolling elements is formed by the first ball rolling groove and the second ball rolling groove, a return path for the rolling elements, and a pair of direction changing paths for allowing the return path and the ball rolling path to communicate with each other,
wherein one of the guide rail and the slider linearly moves relative to another one thereof as the rolling elements roll in a circulating path, the circulating path being formed by the ball rolling path, the return path and the direction changing path,
wherein the slider includes a metallic main body, a frame which is fitted so as to be readily detachable and attachable to outer sides of the main body, and a pair of end caps which are fixed to the main body through the frame,
the frame including a pair of outer legs each constituting a widthwise outer portion of the leg portion, and a pair of frame horizontal portions each constituting an opposite end portion, as viewed in a linearly moving direction, of the horizontal portion, each of the outer legs having the return path, an inside groove of the direction changing path and a first protrusion provided on an inner side of the outer leg,
the main body including a pair of inner legs each constituting a widthwise inner portion of the leg portion and a main body horizontal portion constituting a major portion of the horizontal portion, each of the inner legs having the second ball rolling groove and a first recessed portion corresponding to the first protrusion of the frame provided on an outer side of the inner leg, the main body and the frame being adapted to be integrated as the first protrusion is fitted to the first recessed portion, and
each of the end caps including a pair of end legs each constituting an end portion, as viewed in the linearly moving direction, of the leg portion, and an end cap horizontal portion constituting an extreme end portion, as viewed in the linearly moving direction, of the horizontal portion, each of the end legs having an outside groove of the direction changing path provided on a frame side of the end leg.

2. The linear guide apparatus according to claim 1, wherein the frame is made of synthetic resin,
a longest outside dimension in a slider-widthwise direction between end portions, each lower than the first recessed portion, of both inner legs of the main body is greater than a shortest dimension in the slider-widthwise direction between the first protrusions of the frame, so as to produce an interference fit between the main body and the frame.

3. A method for assembling a linear guide apparatus according to claim 1, the method comprising:
inserting the inner legs of the main body into the frame from the frame horizontal portion side;
fitting the first projections of the frame to the respective first recessed portions of the main body while the frame undergoes elastic deformation;
fixing the end caps to opposite ends, as viewed in the linearly moving direction, of the main body through the frame.

4. The method for assembling a linear guide apparatus according to claim 3, wherein the fixing step includes inserting male screws in through holes respectively formed in the frame horizontal portions and the end cap horizontal portions, and threadedly engaging the male screws with internal threads formed in opposite end faces, as viewed in the linearly moving direction, of the main body horizontal portion.

5. The method for assembling a linear guide apparatus according to claim 3, wherein the fixing step includes inserting second projections, each having a welding allowance and being formed one of an end cap side face of each frame horizontal portion and a frame side face of each end cap horizontal portion, in through holes, each being formed on the other of the end cap side face of each frame horizontal portion and the frame side face of each end cap horizontal portion, and allowing the synthetic resin forming each second projection to plastically flow to a gap between the second projection and the through hole so that the end caps are fixed to the frame.

6. A liner guide apparatus comprising:
a plurality of rolling elements;
a guide rail having a first ball rolling groove for the rolling elements formed on each widthwise opposite surface; and a slider including a pair of leg portions respectively disposed on widthwise opposite sides of the guide rail, and a horizontal portion disposed on one thicknesswise end side of the guide rail and connecting the leg portions, each of the leg portions having a second ball rolling groove provided on an inner side surface and disposed in face-to-face relation to the first ball rolling groove of the guide rail where a ball rolling path for the rolling elements is formed by the first ball rolling groove and the second ball rolling groove, a return path for the rolling elements, and a pair of direction changing paths for allowing the return path and the ball rolling path to communicate with each other,
wherein one of the guide rail and the slider linearly moves relative to another one thereof as the rolling elements roll in a circulating path, the circulating path being formed by the ball rolling path, the return path and the direction changing path,
wherein the slider includes a metallic main body, a frame which is fitted so as to be readily detachable and attachable to outer sides of the main body, and a pair of end caps which are fixed to the main body through the frame,
the frame including a pair of outer legs each constituting a widthwise outer portion of the leg portion, and a pair of frame horizontal portions each constituting an opposite end portion, as viewed in a linearly moving direction, of the horizontal portion, each of the outer legs having the return path, an inside groove of the direction changing path and a first protrusion provided on an inner side of the outer leg,
the main body including a pair of inner legs each constituting a widthwise inner portion of the leg portion and a main body horizontal portion constituting a major portion of the horizontal portion, each of the inner legs having the second ball rolling groove and a first recessed portion corresponding to the first protrusion of the frame provided on an outer side of the inner leg, the main body and the frame being adapted to be integrated as the first protrusion is fitted to the first recessed portion, and
each of the end caps including a pair of end legs each constituting an end portion, as viewed in the linearly moving direction, of the leg portion, and an end cap horizontal portion constituting an extreme end portion, as viewed in the linearly moving direction, of the horizontal portion, each of the end legs having an outside groove of the direction changing path provided on a frame side of the end leg,
wherein the main body horizontal portion has internal threads formed in opposite end faces, as viewed in the linearly moving direction, and the frame horizontal portions and the end cap horizontal portions have respective through holes corresponding to the internal threads of the main body horizontal portion, and
the end cap and the frame are fixed to the main body with male screws which are threadedly engaged with the internal threads of the main body through the through holes of the end cap and the frame.

7. A linear guide apparatus comprising:
a plurality of rolling elements;
a guide rail having a first ball rolling groove for the rolling elements formed on each widthwise opposite surface; and a slider including a pair of leg portions respectively disposed on widthwise opposite sides of the guide rail, and a horizontal portion disposed on one thicknesswise end side of the guide rail and connecting the leg portions, each of the leg portions having a second ball rolling groove provided on an inner side surface and disposed in face-to-face relation to the first ball rolling groove of the guide rail where a ball rolling path for the rolling elements is formed by the first ball rolling groove and the second ball rolling groove, a return path for the rolling elements, and a pair of direction changing paths for allowing the return path and the ball rolling path to communicate with each other,
wherein one of the guide rail and the slider linearly moves relative to another one thereof as the rolling elements roll in a circulating path, the circulating path being formed by the ball rolling path, the return path and the direction changing path,
wherein the slider includes a metallic main body, a frame which is fitted so as to be readily detachable and attachable to outer sides of the main body, and a pair of end caps which are fixed to the main body through the frame,
the frame including a pair of outer legs each constituting a widthwise outer portion of the leg portion, and a pair of frame horizontal portions each constituting an opposite end portion, as viewed in a linearly moving direction, of the horizontal portion, each of the outer legs having the return path, an inside groove of the direction changing path and a first protrusion provided on an inner side of the outer leg,
the main body including a pair of inner legs each constituting a widthwise inner portion of the leg portion and a main body horizontal portion constituting a major portion of the horizontal portion, each of the inner legs having the second ball rolling groove and a first recessed portion corresponding to the first protrusion of the frame provided on an outer side of the inner leg, the main body and the frame being adapted to be integrated as the first protrusion is fitted to the first recessed portion, and each of the end caps including a pair of end legs each constituting an end portion, as viewed in the linearly moving direction, of the leg portion, and an end cap horizontal portion constituting an extreme end portion, as viewed in the linearly moving direction, of the horizontal portion, each of the end legs having an outside groove of the direction changing path provided on a frame side of the end leg, wherein the main body horizontal portion has a recessed portion in a central portion in a slider-widthwise direction of an upper surface, and the slide further has a plate-shaped member being disposed in the recessed portion of the main body horizontal portion, the plate-shaped member has engaging portions formed in opposite end faces, as viewed in the linearly moving direction, each of the end cap horizontal portions has a fitting portion formed at a frame side, and the plate-shaped member is retained by the end caps by fitting of the fitting portions and the engaging portions, and each of the frame horizontal portions has a projection extending in the linearly moving direction which is formed on the outer side of the frame horizontal portion, each of the end cap horizontal portions has a through hole corresponding to the projection of the frame horizontal portion, and the end cap is fixed to the frame by passing the projections through the through holes and melting distal ends of the projections of the frame horizontal portions.

8. A linear guide apparatus comprising:

a plurality of rolling elements;

a guide rail having a first ball rolling groove for the rolling elements formed on each widthwise opposite surface; and a slider including a pair of leg portions respectively disposed on widthwise opposite sides of the guide rail, and a horizontal portion disposed on one thicknesswise end side of the guide rail and connecting the leg portions, each of the leg portions having a second ball rolling groove provided on an inner side surface and disposed in face-to-face relation to the first ball rolling groove of the guide rail where a ball rolling path for the rolling elements is formed by the first ball rolling groove and the second ball rolling groove, a return path for the rolling elements, and a pair of direction changing paths for allowing the return path and the ball rolling path to communicate with each other, wherein one of the guide rail and the slider linearly moves relative to another one thereof as the rolling elements roll in a circulating path, the circulating path being formed by the ball rolling path, the return path and the direction changing path, wherein the slider includes a metallic main body, a frame which is fitted so as to be readily detachable and attachable to outer sides of the main body, and a pair of end caps which are fixed to the main body through the frame, the frame including a pair of outer legs each constituting a widthwise outer portion of the leg portion, and a pair of frame horizontal portions each constituting an opposite end portion, as viewed in a linearly moving direction, of the horizontal portion, each of the outer legs having the return path, an inside groove of the direction changing path and a first protrusion provided on an inner side of the outer leg, the main body including a pair of inner legs each constituting a widthwise inner portion of the leg portion and a main body horizontal portion constituting a major portion of the horizontal portion, each of the inner legs having the second ball rolling groove and a first recessed portion corresponding to the first protrusion of the frame provided on an outer side of the inner leg, the main body and the frame being adapted to be integrated as the first protrusion is fitted to the first recessed portion, and each of the end caps including a pair of end legs each constituting an end portion, as viewed in the linearly moving direction, of the leg portion, and an end cap horizontal portion constituting an extreme end portion, as viewed in the linearly moving direction, of the horizontal portion, each of the end legs having an outside groove of the direction changing path provided on a frame side of the end leg, wherein the slider includes a filler disposed in a boundary portion between the main body and the frame and a boundary portion between the frame and each of the end caps.

\* \* \* \* \*